(12) United States Patent
Merrill

(10) Patent No.: US 7,082,391 B1
(45) Date of Patent: Jul. 25, 2006

(54) AUTOMATIC SPEECH RECOGNITION

(75) Inventor: John W. Merrill, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 09/115,359

(22) Filed: Jul. 14, 1998

(51) Int. Cl.
*G10L 15/00* (2006.01)

(52) U.S. Cl. .................................. 704/231

(58) Field of Classification Search ............. 704/231, 704/270, 275
See application file for complete search history.

(56) References Cited

U.S. PATENT DOCUMENTS

| | | | |
|---|---|---|---|
| 5,632,002 A * | 5/1997 | Hashimoto et al. | 704/275 |
| 5,664,061 A * | 9/1997 | Andreshak et al. | 704/275 |
| 5,774,841 A * | 6/1998 | Salazar et al. | 704/225 |
| 5,983,190 A * | 11/1999 | Trower, II et al. | 704/275 |

FOREIGN PATENT DOCUMENTS

EP 0 785 540 A2 7/1997

OTHER PUBLICATIONS

Denning, Adam, ActiveX Controls Inside Out, Microsoft Press, pp. 110-111, Dec. 1997.*
Schmandt, Mark S. et al, Augmenting a window System with speech input, Computer magazine, vol. 8, issue 8, pp. 50-56, Aug. 1990.*
*Voice Windows* IBM Technical Disclosure Bulletin, vol. 38, No. 7, Jul. 1 1995, p. 461.
*Easy Navigate Task List By Voice*, IBM Technical Disclosure Bulletin, vol. 40, No. 5, May 1, 1997. p. 81.

* cited by examiner

*Primary Examiner*—David D. Knepper
(74) *Attorney, Agent, or Firm*—Trop, Pruner & Hu, P.C.

(57) ABSTRACT

A system for responding to spoken commands enables a computer system to avoid some synchronization problems. In certain embodiments, object oriented programming may be utilized to create an object which seamlessly coordinates between an application program and a speech engine. An object may respond to a given command which is applied tactilely or through spoken commands in a fashion which allows the application to act in the same way whatever the form of the input. In this way, an application may efficiently utilize spoken commands. For example, the spoken commands may be recognized as applying to one of two currently active tasks or windows. Through coordination with the application itself, the speech engine can be advised of a sub-vocabulary within its overall vocabulary which should be consulted in connection with certain ongoing commands. This improves the accuracy of the speech recognition process, since the spoken words need only be compared to a smaller sub-vocabulary for speech recognition purposes.

20 Claims, 5 Drawing Sheets

AUTOMATIC SPEECH RECOGNITION

BACKGROUND

This invention relates generally to speech recognition and particularly to the control of computer software using spoken commands.

Currently available speech recognition software recognizes discrete spoken words or phonemes contained within words in order to identify spoken commands. The processing of the spoken commands is usually accomplished using what is known as a speech engine. Regardless of whether discrete terms or phonemes are utilized, the speech engine must be called by the application program which needs the speech recognition service.

Operating systems may include Application Program Interface (API) software utilities which provide speech recognition. The application may incorporate a call to the speech API or the speech recognition may be supplied externally by a second application that intercepts the speech and feeds the first application simulated keys or commands based on the speech input.

Having the application call the speech API requires the application to have intimate knowledge of the speech API, but more importantly forces the application to handle inputs from multiple sources and to attempt to synchronize these inputs. At any given instance of time, the application may receive a spoken command, may receive a return from a speech API and may also be processing tactile inputs such as associated key operations. This complexity makes the application prone to state errors. Providing a second application to intercept the spoken commands may not always be possible and requires an external server that has intimate knowledge of every application it must service.

Thus, there is a continuing need for a speech recognition system which operates with a speech engine without synchronization problems. In addition, there is a need for such a system that can send application commands from either speech or tactile responses. It would also be desirable to provide a speech recognition system which has relatively high reliability in terms of the ability to consistently recognize basic commands.

SUMMARY

In accordance with one aspect, a method for recognizing speech includes providing a speech engine with a vocabulary of command sets. The appropriate command set for the current software application is communicated to the speech engine.

In accordance with another aspect, a method of recognizing speech includes associating speech units with an identifier. The identifier is also associated with an action to be taken in response to the speech unit. The identifier for a given spoken speech unit is determined and the identifier is provided to a software object.

DETAILED DESCRIPTION

Figure 1:
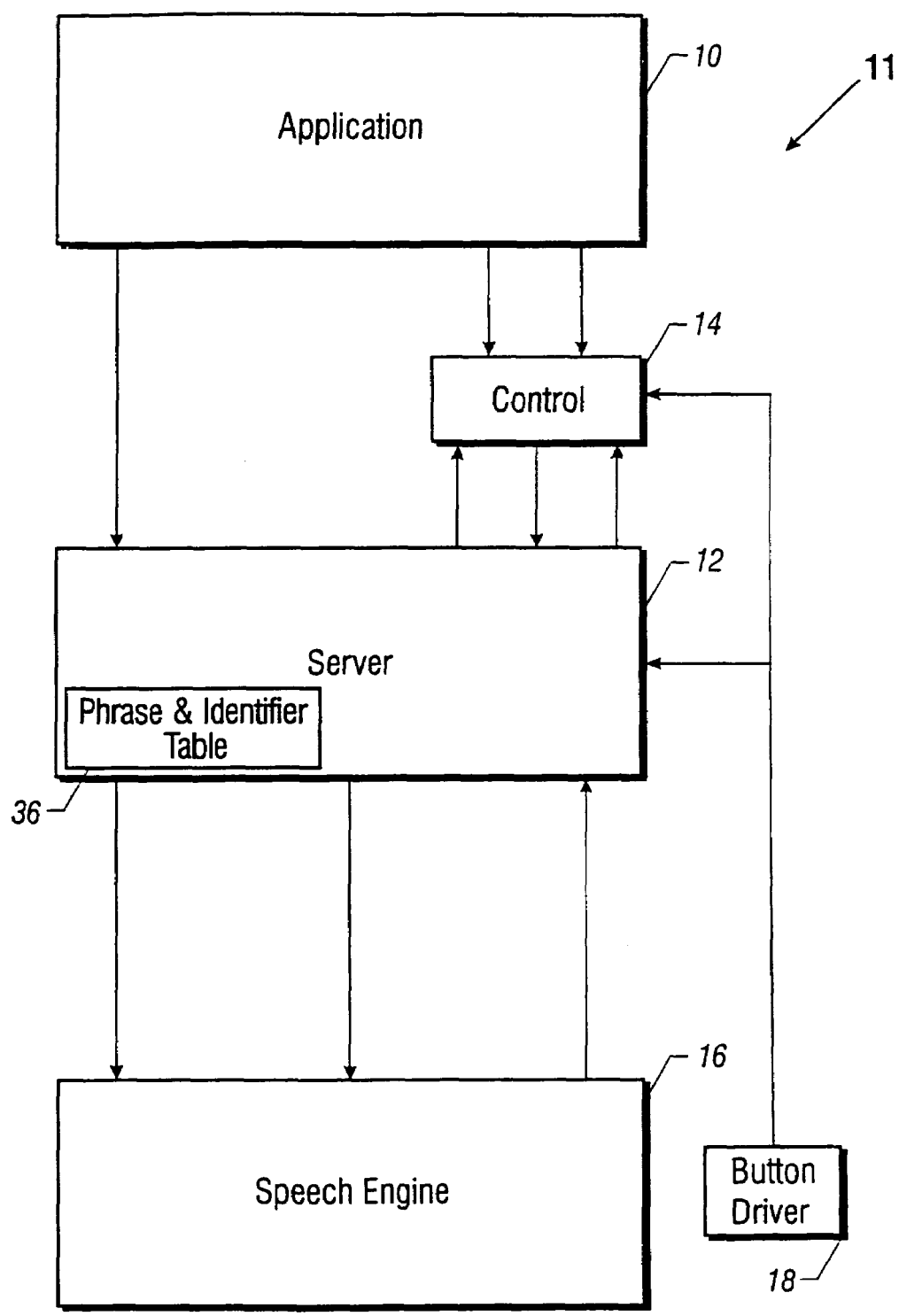
FIG. 1 is a block diagram of a speech recognition system.

Referring to FIG. 1, a speech recognition system 11 involves an application software program 10 which needs to respond to spoken commands. For example, the application 10 may be implemented through various graphical user interfaces or windows in association with the Windows® operating system. Those windows may call for user selection of various tasks or control inputs. The application 10 may respond either to spoken commands or tactile inputs. Tactile inputs could include pushing a keyboard key, touching a display screen, or mouse clicking on a visual interface.

The speech recognition system 11 may be useful in connection with a variety of computer systems. One application for the system 11 is in connection with in car personal computer systems. These systems may be mounted in motor vehicles and may provide conventional computer functionality together with navigation functions, safety functions and entertainment functions. It may be desirable to allow the driver of the motor vehicle to provide spoken commands to the computer system to implement various functions without the need for tactile inputs. This would allow the driver to focus on operating the motor vehicle. For example, in connection with a navigation application program, the user could use spoken commands to initiate the application, to bring up an appropriate map, and initiate a desired function, such as providing directions to a particular location.

The application 10 communicates with a server 12. In an object oriented programming language, the server 12 could be a container. In the illustrated embodiment, the server 12 communicates with the control 14 which could be an object or an ActiveX control, for example. The control 14 also communicates directly with the application 10.

The server 12 can call the speech recognition engine 16. At the same time, a button driver 18 can provide inputs to the server 12 and the control 14. Thus, in some embodiments, the control 14 can receive either spoken or tactile inputs (from the button driver 18) and acts in response to each type of input in essentially the same way.

Figure 2:
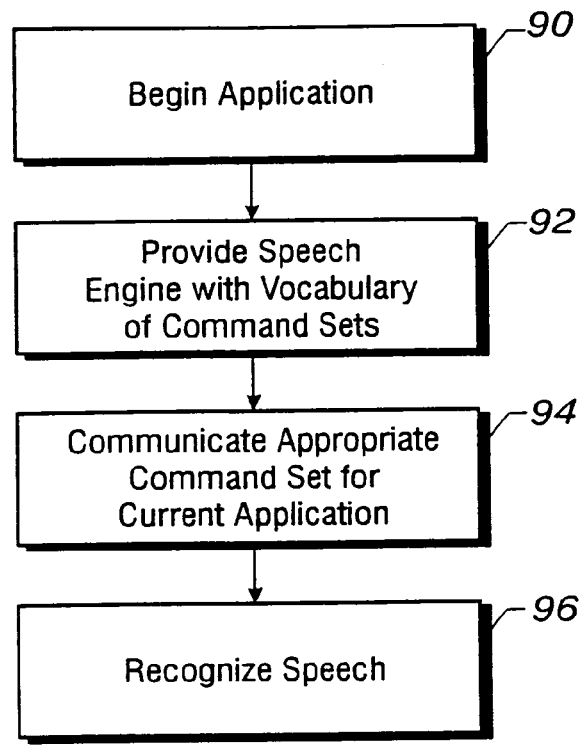
FIGS. 2–4 are flow diagrams for the speech recognition system shown in FIG. 1.

Referring to FIG. 2, a program for recognizing speech may involve beginning an application (block 90) that needs speech recognition services. The speech engine is provided with a vocabulary of command sets for an active screen or task, as indicated in block 92. The command sets could be the vocabulary for each of the various applications that are implemented by the particular computer system. The command set for the current application that is currently running is communicated to the server 12 or control 14 (block 94). Next, the speech is recognized and appropriate actions are taken, as indicated in block 96.

Figure 3:
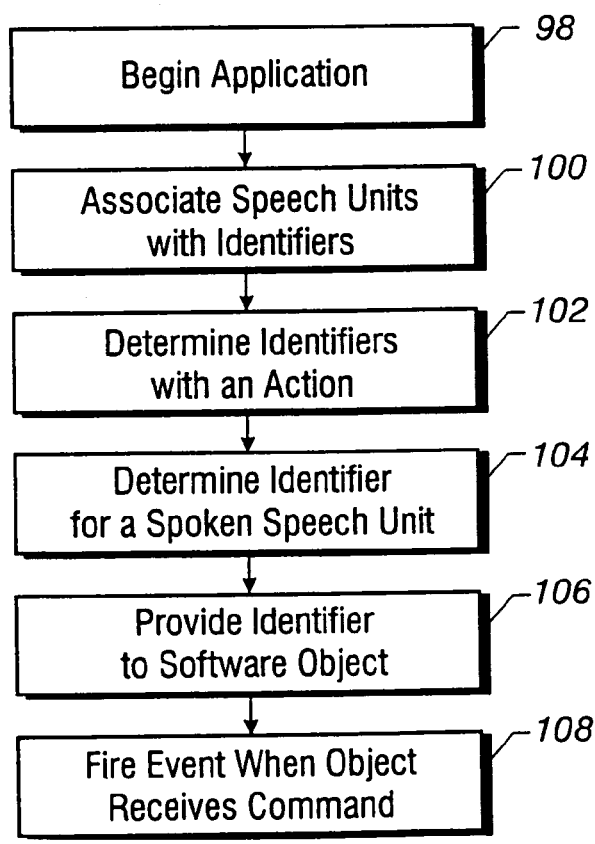

Another implementation, shown in FIG. 3, also begins with starting an application, as indicated in block 98. Speech units that need to be decoded are associated with identifiers (block 100). The identifiers may then be associated with a particular action to be taken in the application in response to the spoken command (block 102). Next, the flow determines the identifier for a particular spoken speech unit (block 104). The identifier is provided to a software object such as the control 14, as indicated in block 106. An event is fired when the object receives the command, as shown in block 108. The event may be fired by the object whether the command is a result of a spoken command or a tactilely generated command.

Figure 4:
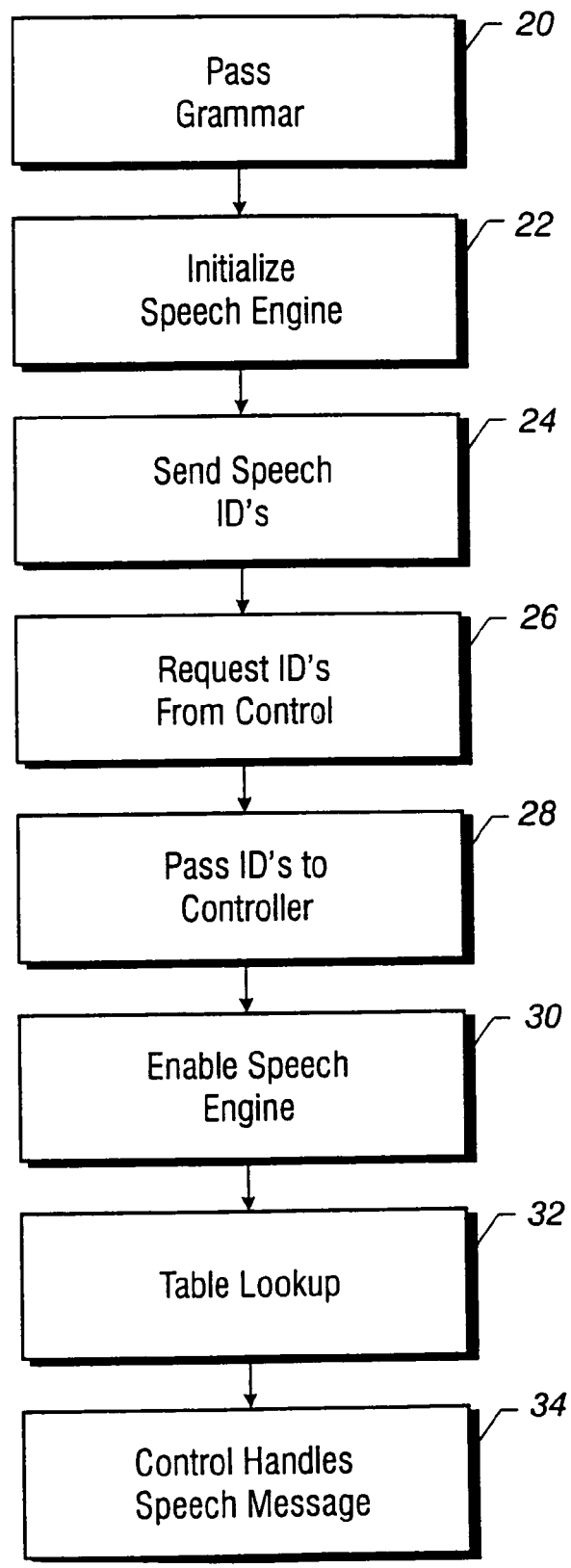

Referring to FIG. 4, the application 10 passes a grammar table to the server 12 (block 20). In particular, the application initializes the grammar with speech identifiers associated with each spoken command used in the application. These commands make up all of the command sets for a given engine. The grammar is a set of commands that may include alternative phrases. For example, a simple grammar could be (start/begin)(navigator). This grammar would respond to the spoken commands "start navigator" and "begin navigator".

The speech recognition engine 16 can operate on phonemes or with discrete terms. Thus, the application provides the particular command set (which is a subset of the engine's available commands) with the active application. This facilitates speech recognition because the speech recognition engine can be advised of the particular words (command set) that are likely to be used in the particular application that is running. Thus, the speech recognition engine only needs to match the spoken words with a smaller sub-vocabulary. For example, if the navigator function was operating, only the command set of words associated with that application need be decoded.

In response, the server 12 initializes the speech engine 16 (block 22). The server 12 has a phrase and identifier table 36 as indicated in FIG. 1. The application 10 also sends the speech identifiers associated with given spoken commands to the control 14 or server 12 (block 24). When the control 14 is activated in the container or server, the control may call the OnControlInfoChanged method in the IOleControlSite interface, in an embodiment using ActiveX controls. This provides for transfer of information from the control 14 to the server 12 (block 26). The server in turn may call the GetControlInfo method from the IOleControl interface which allows communications from the server or container 12 to the control 14 (block 28).

The server uses the GetControlInfo method in the IOleControl interface and the OnMnemonic method in IOleControl to request identifiers from the control. The control may provide this information through IOleControlSite interface and the OnControlInfoChanged method, using ActiveX technology for example.

The server 12 enables the speech engine 16 (block 30), for any commands that are active, from the server's table 36. The server uses the table 36 from the application to provide focus in particular applications. The control provides an effect comparable to that of an accelerator key. Namely, it provides a function that can be invoked from any window or frame reference. The application provides the speech identifiers and associates the identifiers with an action by the control.

The server knows which vocabulary to use based on what task is running currently. In a system using windows this would correspond to the active screen. Thus, if the navigator is running, the server knows what the sub-vocabulary is that must be recognized by the speech engine.

When the server receives a speech message, it calls the speech API in the engine 16. When a phrase is detected, the engine provides the phrase to the server for example, as a text message. The container does a table look-up (block 32). On a match between the phrase and the identifier, the server 12 may call the OnMnemonic method of the IOleControl interface, passing the identifier to the control. The control follows its preprogrammed rules and implements the corresponding action (block 34). The control may handle the message internally or send an event to the server.

As a simple example, a given screen may include two buttons, "ok" and "delete". When the application comes up it sends the grammar for this screen to the server. For example, the grammar for "ok" might include "ok", "right" and "correct".

The application then associates "ok" with an identifier which corresponds to a particular control and does the same thing with "delete". The identifier is simply a pointer or handle that is unique, within the application, to the particular command. The table 36 then includes the phrases "ok" and "delete", an identifier for each phrase and an identifier for the control that handles the command.

When a control is instantiated, the application provides it with its identifier. The control is preprogrammed with the action it will take when the server advises the control that its identifier has been called.

When a speaker uses a word, the speech engine sends the word to the server. The server checks the phases in its table 36 to see if the word is in its active list. In the simple example, if the word sent by the speech engine is not "ok" or "delete," it is discarded. This would indicate a speech engine error. If there is a match between the word and the active vocabulary, the server sends the appropriate control identifier to the appropriate control, which then acts-according to its programmed instructions.

A phoneme based speech engine with a large vocabulary can be used with high reliability because the engine is focused on a limited vocabulary at any given time. Advantageously this limited vocabulary may be less than 20 words in the table 36 at any given instance.

This frees the application from having to keep track of the active vocabulary. The server can tell the server which words to watch for at a given instance based on the active task's vocabulary.

There may also be a global vocabulary that is always available regardless of the active screen. For example, there may be a "Jump" command to switch screens or an "Off" command to terminate the active task.

Advantageously, the existing mnemonics or "hot keys" available in Microsoft Windows® may be used to implement speech recognition. For example, the OnMnemonic method may be given the new function of passing information from the server to the control corresponding to a spoken command.

While the methodology is described in connection with an ActiveX control, other object oriented programming technologies may be used as well including, for example, Javabeans and COM. In addition, still other such techniques may be developed in the future.

Figure 5:
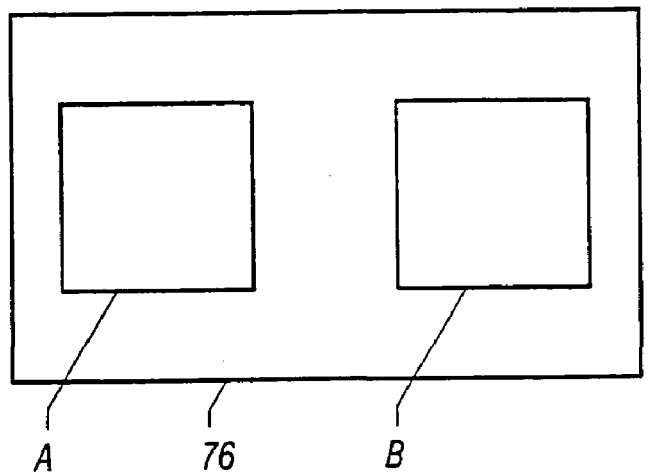
FIG. 5 is a schematic view of a computer display with two active windows.
Figure 6:
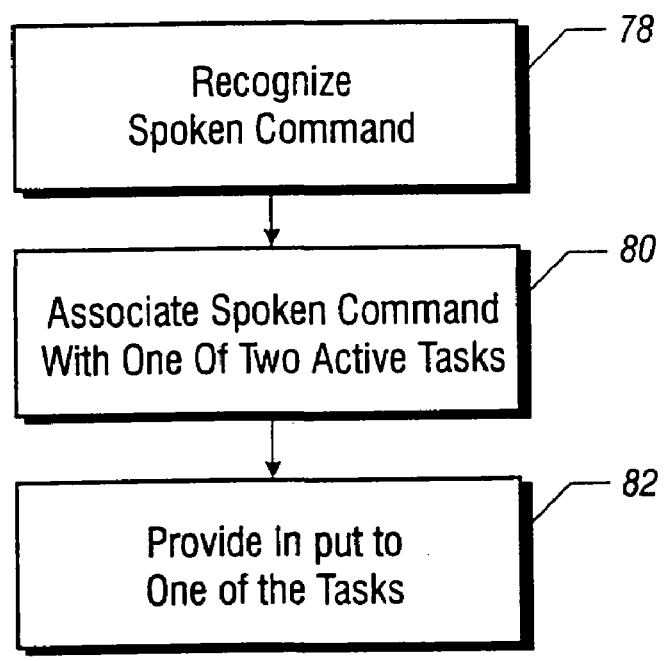
FIG. 6 is a flow diagram of a program in accordance with one embodiment.

With embodiments of the present invention, an effect comparable to that of an accelerator key is provided. It gives a focus to the command with reference to a particular application. Therefore, speech can be used to focus between two operating tasks. For example, as shown in FIG. 5, if two windows A and B are open at the same time on the screen 76, the command that is spoken can be recognized as being associated with one of the two active task windows or frames. Referring to FIG. 6, after a command is recognized (block 78), the application provides information about what is the primary, currently operating task and the speech may be associated with that particular task to provide focus (block 80). An input is then provided to one of the tasks (and not the other), as indicated at block 82. In this way, the speech recognition is accomplished in a way which is effectively invisible to the application. To the application, it seems as though the operating system is effectively doing the speech recognition function. Synchronization is largely unnecessary.

The message which is passed to the ActiveX control from the container can include a field which allows the application to know if the command was speech generated. This may be useful, for example, when it is desired to given a spoken response to a spoken command. Otherwise, the application is basically oblivious to whether or not the command was speech generated or tactilely generated.

While the application loads the identifiers into the ActiveX controls (when they are instantiated), the controls and the container handle all of the speech recognition for the command words. The control and its container are responsible for managing when the words are valid and for sending appropriate messages to the application. Thus, the container or server does all the communication with the speech recognition API. The container may communicate with the ActiveX controls by standard interfaces such as IOleControl. As a result, the number of state errors that would otherwise occur if the application were forced to handle the speech recognition itself.

Figure 7:
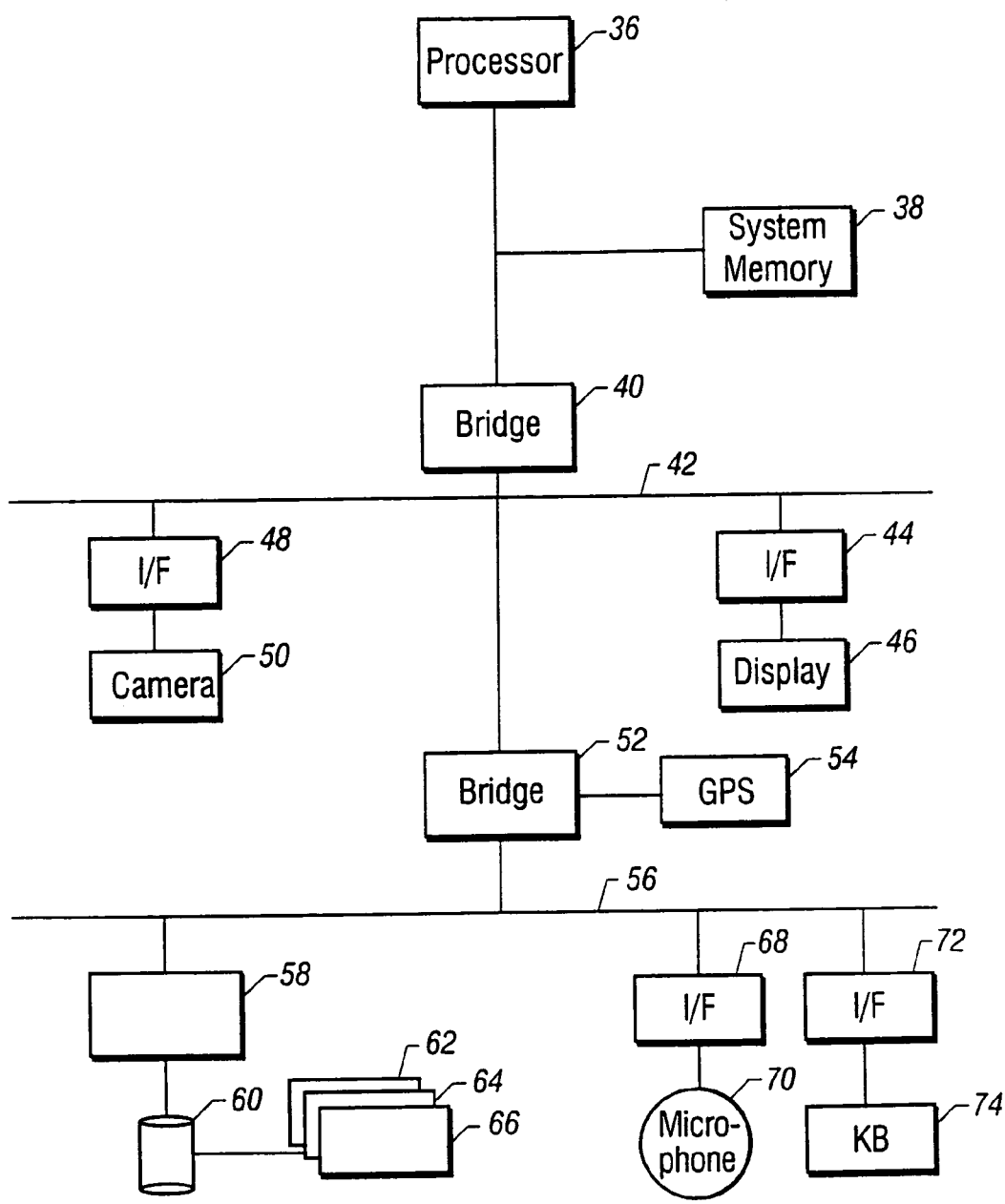
FIG. 7 is a block diagram of a hardware system for use with the speech recognition system.

Referring now to FIG. 7, a hardware system for implementing the embodiment shown in FIG. 1 may include a processor 36 connected to a bridge 40 and system memory 38. The bridge 40 is coupled to a bus 42. The bus 42 may include interfaces 48 and 44 which communicate with, for example, a camera 50 and a visual display or monitor 46 in the illustrated embodiment. The bridge 40 also communicates with a bridge 52. The bridge 52 may be provided with a connection to an additional bus 56 and to a global positioning system input 54. The bus 56 in turn communicates with an interface 58 and a hard drive 60. The hard drive 60 may include application programs 62, 64 and 66 which could be for example, a navigator function, an entertainment package, and a television package, for example, in a system which implements an in car personal computer. The bus 56 also may communicate through an interface 68 with a microphone 70 for receiving the spoken commands. An interface 72 couples a keyboard 74 which may be optionally utilized in an in car personal computer system. The keyboard 74 may be an abbreviated keyboard which, for example, associates given elements on the display with particular keys which may be operated. In addition it may include one or more special function keys.

While the present invention has been described with respect to a limited number of preferred embodiments, those skilled in the art will appreciate numerous modifications and variations therefrom. It is intended that the appended claims cover all such modifications and variations as fall within the true spirit and scope of the present invention.

What is claimed is:

1. A method for responding to user inputs to a computer comprising:
   providing a single software object that receives both spoken and non-spoken command information;
   firing an event when said object receives spoken command information; and
   firing an event when said object receives non-spoken command information such that the same object can handle both spoken and non-spoken command information.

2. The method of claim 1 including providing a speech engine with a vocabulary command set for at least two tasks and communicating the appropriate command set for an active task to a speech engine.

3. The method of claim 1 including associating a command with an identifier and associating the identifier with an action to be taken in response to a command, determining the identifier for a command and providing the identifier to said object.

4. The method of claim 3 including instantiating said object in a container and communicating the identifier to the object for a command.

5. The method of claim 4 including communicating information about a first spoken command to the container, checking an active vocabulary list in the container to determine if the first spoken command is one used in an active task, and if the first spoken command is one used in an active task, transferring the identifier for the spoken command to said object.

6. The method of claim 1 including handling spoken and non-spoken commands in the same way.

7. An article comprising a medium storing instructions that, if executed, enable a processor-based system to:
   provide a single software object that receives both spoken and non-spoken command information;
   fire an event when said object receives spoken command information; and
   fire an event when said object receives non-spoken command information such that the same object can handle both spoken and non-spoken command information.

8. The article of claim 7 further storing instructions that, if executed, enable a processor-based system to provide a speech engine with a vocabulary command set for at least two tasks and communicate the appropriate command set for an active task to a speech engine.

9. The article of claim 7 further storing instructions that, if executed, enable a processor-based system to associate a command with an identifier and associate the identifier with an action to be taken in response to a command, determine the identifier for a command and provide the identifier to said object.

10. The article of claim 9 further storing instructions that, if executed, enable a processor-based system to instantiate said object in a container and communicate the identifier to the object for a command.

11. The article of claim 10 further storing instructions that, if executed, enable a processor-based system to communicate information about a first spoken command to the container, check an active vocabulary list in the container to determine if the first spoken command is one used in an active task, and, if the first spoken command is one used in an active task, transfer the identifier for the spoken command to said object.

12. The article of claim 7 further storing instructions that, if executed, enable spoken and non-spoken commands to be handled in the same way by the same object.

13. A processor-based system comprising:
   a processor; and
   a storage coupled to said processor, said storage storing instructions that enable the processor to provide a single software object that receives both spoken and non-spoken command information, fire an event once that object receives spoken command information, and fire an event once that object receives non-spoken command information such that the same object can handle both spoken and non-spoken command information.

14. The system of claim 13 including an input device, coupled to said processor, to receive spoken commands.

15. The system of claim 13, said object to handle tactilely entered commands and spoken commands in the same way.

16. The article of claim 15 wherein said storage stores instructions that, if executed, enable a processor-based system to instantiate said object in a container and communicate the identifier to the object for a command.

17. The system of claim 13 wherein said storage stores instructions that, if executed, enable the processor-based system to provide a speech engine with a vocabulary command set for at least two tasks and communicate the appropriate command set for an active task to each speech engine.

18. The article of claim 17 wherein said storage stores instructions that, if executed, enable a processor-based system to communicate information about a first spoken command to the container, check an active vocabulary list in the container to determine if the first spoken command is one used in an active task, and, if the first spoken command is one used in an active task, transfer the identifier for the spoken command to said object.

19. The article of claim 13 wherein said storage stores instructions that, if executed, enable a processor-based system to associate a command with an identifier and associate the identifier with an action to be taken in response to a command, determine the identifier for a command and provide the identifier to said object.

20. The article of claim 13 wherein said storage stores instructions that, if executed, enable spoken and non-spoken commands to be handled in the same way by the same object.

* * * * *